United States Patent
Brettmann

(10) Patent No.: US 6,378,930 B1
(45) Date of Patent: Apr. 30, 2002

(54) WIND DEFLECTOR FOR A CONVERTIBLE VEHICLE

(75) Inventor: Jörg Brettmann, Sottrum (DE)

(73) Assignee: CTS Fahrzeug-Dachsysteme GmbH (DE)

(*) Notice: Subject to any disclaimer, the term of this patent is extended or adjusted under 35 U.S.C. 154(b) by 0 days.

(21) Appl. No.: 09/965,927

(22) Filed: Sep. 28, 2001

(30) Foreign Application Priority Data

Oct. 10, 2000 (DE) .......................................... 100 50 284

(51) Int. Cl.[7] .................................................. B60J 7/22
(52) U.S. Cl. ...................................... 296/85; 296/180.1
(58) Field of Search ............................ 296/85, 180.1, 296/107.07

(56) References Cited

U.S. PATENT DOCUMENTS 5,658,039 A * 8/1997 Bennett .................... 296/85 X
6,062,625 A * 5/2000 Eleinrieder et al. ....... 296/85 X
6,095,590 A * 8/2000 Matsuda et al. .......... 296/180.1

FOREIGN PATENT DOCUMENTS

| DE | 31 28 671 | 2/1982 |
| DE | 43 32 938 | 12/1994 |
| DE | 198 26 672 | 12/1999 |
| DE | 198 41 788 | 3/2000 |
| GB | 2225992 | * 6/1990 |

* cited by examiner

*Primary Examiner*—Joseph D. Pape
(74) *Attorney, Agent, or Firm*—Klaus J. Bach

(57) ABSTRACT

In a wind deflector operating mechanism for a convertible with an adjustable top, wherein the wind deflector is supported by vertical guide rails so as to be movable between lowered and raised positions and the vehicle top is movable between a closed position and a storage position, a drive mechanism for opening and closing the vehicle top is adapted to engage an operating linkage for raising and lowering the wind deflector in such a way that movement of the wind deflector occurs only during certain movement phases of the drive mechanism.

11 Claims, 9 Drawing Sheets

WIND DEFLECTOR FOR A CONVERTIBLE VEHICLE

BACKGROUND OF THE INVENTION

The invention relates to a wind deflector for a convertible vehicle wherein the wind deflector is supported on vertical guide tracks so as to be movable between a lowered and a raised position by a wind deflector operating mechanism.

Wind deflectors are arranged in convertible vehicles behind the vehicle seats when the vehicle top is open in a position such that they extend upwardly beyond the heads of the occupants in order to avoid exposure of the occupants to turbulent air movements. Upon opening of the vehicle top and its placement into a storage compartment behind the vehicle seats, the wind deflector is moved from a lowered position behind the vehicle front seats to raised position. When the vehicle top is closed, the wind deflector must be in a lowered position in order to avoid interference with the vehicle top.

DE 198 41 788 A1 discloses a wind deflector which is slidably supported in guide tracks provided at the backside of the backrests of the vehicle seats. The deflectors can be moved manually vertically between a lowered and a raised position. In order to prevent unwanted backsliding of the deflector from the raised position to the lowered position, the deflector can be locked in the raised position by a locking mechanism.

This wind deflector however has the disadvantage that it must be moved by hand from one position to the other and before it can be moved out of the raised position, the lock must be manually released. For raising and for lowering the wind deflector, the driver must actually leave the vehicle. This deflector is therefore cumbersome to operate.

DE 198 26 672 A1 also discloses a wind deflector for a convertible vehicle which is slideably supported on vertical tracks disposed behind the vehicle seats between a lower rest position and an upwardly extended operating position. The movement of the wind deflector is coupled with a roll bar, which is adjustable between a lowered position and an upwardly extended operating position. During normal vehicle operation, the roll bar is in an intermediate position between the lowered rest position and the extended operating position. The wind deflector is automatically moved with the roll bar. Wind deflector and roll bar are firmly interconnected and movable only in unison between the lowered and extended positions. For the adjustment, a special drive is provided which is independent of the vehicle top operating mechanism. This requires an independent actuation of the vehicle top operating mechanism and the roll bar drive that is the operating signals must be coordinated.

In a particular embodiment of the wind deflector and roll bar operating arrangement as disclosed in DE 198 26 672 A1, the deflector movement can be uncoupled from the roll bar movement when, in the case of a vehicle roll-over accident, the roll bar is fully extended. In that case, the wind deflector remains in the position it is in before the roll-over accident and only the roll bar is extended. A coordinated movement of the wind deflector with the vehicle top during normal closing and opening of the top is not disclosed in DE 198 26 672 A1.

DE 43 32 938 C1 discloses a convertible vehicle with an adjustable vehicle top and a wind deflector, which is pivotable about a transverse vehicle axis, and, which is coupled with the vehicle top operating mechanism so that opening of the vehicle top results in an upward pivoting of the wind deflector. The wind deflector and the vehicle top are kinematically interconnected so that for any position of the vehicle top during movement between the closed and the storage position, there is a corresponding wind deflector position. Since the wind deflector and the vehicle top are moved in unison, a sufficiently large space for the movement of the wind deflector must be provided, which space must not be intruded by the top or the top operating mechanism during transfer movement thereof between the closed and the storage positions. As a result, there are substantial restraints for the design of the vehicle top or, respectively, its path of movement during the transfer.

It is the object of the present invention to provide a wind deflector for a convertible vehicle, which is simple and convenient to operate. Particularly, the wind deflector should not require much space and, in a raised position, it should be safely fixed in its position.

SUMMARY OF THE INVENTION

In a wind deflector operating mechanism for a convertible an adjustable top, wherein the wind deflector is supported by vertical guide rails so as to be movable between lowered and raised positions and the vehicle top is movable between a closed position and a storage position, a drive mechanism for opening and closing the vehicle top is adapted to engage an operating linkage for raising and lowering the wind deflector in such a way that movement of the wind deflector occurs only during certain movement phases of the drive mechanism.

The wind deflector according to the invention is supported by guide tracks arranged behind the vehicle seats so as to be movable vertically between a lowered and a raised position. The movement of the wind deflector is achieved by an operating mechanism, which is actuated automatically by the drive mechanism for the vehicle top by which the vehicle top is moved between the closed and the storage positions. Since the drive mechanism for the vehicle top and the operating mechanism for the wind deflector are interconnected, a single drive unit is sufficient for operating the vehicle top as well as the wind deflector. Important for the operation is from which movement part of the vehicle top drive mechanism the movement of the wind deflector is derived. The vehicle top drive and the wind deflector operating mechanism are preferably mechanically coupled so that, for each position of the vehicle top, there is a corresponding position of the wind deflector.

Furthermore, the wind deflector operating mechanism may be uncoupled from the top drive whereby the movement of the vehicle top and the movement of the wind deflector may be coordinated in a non-linear manner. In this way with a continuous movement of the top between its closed and its storage position, only certain movement phases of the vehicle top may be utilized for operating the wind deflector. Also during certain movement phases of the top, the movement of the wind deflector may be accelerated or retarded or, respectively, delayed with respect to the movement of the top.

With the non-linear coupling of the top drive and wind deflector operating mechanism, it is possible to provide for movement of the wind deflector only during certain phases of the top movement. In accordance with a preferred embodiment, the wind deflector is raised subsequently to the transfer movement of the vehicle top from the closed to the storage position. To this end, the wind deflector operating mechanism is uncoupled from the top drive for certain operating phases. Preferably, at the beginning of the opening movement of the vehicle top when the wind deflector is still in the lowered position, the wind deflector operating mechanism is first uncoupled from the top drive mechanism so that in the first phase of the top opening movement only the vehicle top is moved while the wind deflector remains in its lowered position behind the vehicle seats. When the vehicle top is deposited in its storage compartment, the wind deflector operating mechanism is coupled to the top drive mechanism for movement from the lowered to the raised position. During operation of the wind deflector, the vehicle top may be uncoupled from the vehicle top drive. In this way, the top drive can be used to operate the vehicle top as well as the wind deflector.

During movement in the opposite direction—transfer of the vehicle top from the storage position to the closed positions—the operational step also occurs in the opposite sense: first, the wind deflector is lowered from the raised position to the lower position. Subsequently, the vehicle top is moved out of the storage position to the closed position in which it covers the passenger compartment. In this direction of movement, the wind deflector is first coupled to the drive and the drive is coupled to the top drive mechanism only after the wind deflector has been lowered to its lowered position and the drive has been uncoupled from the wind deflector operating mechanism.

The out-of-phase operation of the wind deflector and the vehicle top has the advantage that interference between the vehicle top and the wind deflector is avoided. The path of movement of the vehicle top can cross the path of movement of the wind deflector without interference. As a result, the top may be compact and relatively low and an inclined rear end area may be provided.

The coupling and uncoupling of the top drive and respectively, the wind deflector operating mechanism is preferably achieved with a hydraulic operating mechanism, that is, preferably a hydraulic cylinder arrangement which, in the various different phases of the opening or, respectively, closing movement of the top, actuates either the vehicle top or the wind deflector. The full stroke of the hydraulic cylinder is divided into two partial stroke movements such that, with the first partial stroke, solely the vehicle top is operated. With a second partial stroke, which is preferably shorter than the first partial stroke, only the wind deflector is operated by the hydraulic cylinder. (Vice versa during the closing procedure.) In this way, it is possible to operate the wind deflector and the vehicle top with a common drive unit in a sequenced manner.

The coupling of the wind deflector operating mechanism to the vehicle top drive for the transmission of the partial stroke movement of the hydraulic cylinder and the uncoupling therefrom is achieved preferably by a coupling and uncoupling device arranged in the motion transmission path between the drive unit—the hydraulic cylinder—and the kinematic operating mechanism for the wind deflector. Freewheeling transmission elements, coupling members or similar devices may be used.

For joining the wind deflector operating mechanism to the vehicle top drive, preferably an operating arm is provided by way of which the wind deflector can be moved between the lowered and the raised positions. The operating arm is preferably pivotally supported on the vehicle body and is pivoted about its pivot axis by the vehicle top drive for actuating the wind deflector. In order to convert the pivot movement of the operating arm to a vertical movement of the wind deflector, a slide track is provided on the wind deflector, in which the operating arm is movably guided. When the operating arm is pivoted by the vehicle top drive about its pivot axis, the end of the operating arm guided along the wind deflector describes a partial circular movement with a vertical motion component. The horizontal motion component is accommodated by the slide track, which extends preferably horizontally.

An embodiment of the invention will be described below in greater detail on the basis of the accompanying drawings.

DESCRIPTION OF A PREFERRED EMBODIMENT

Figure 1:
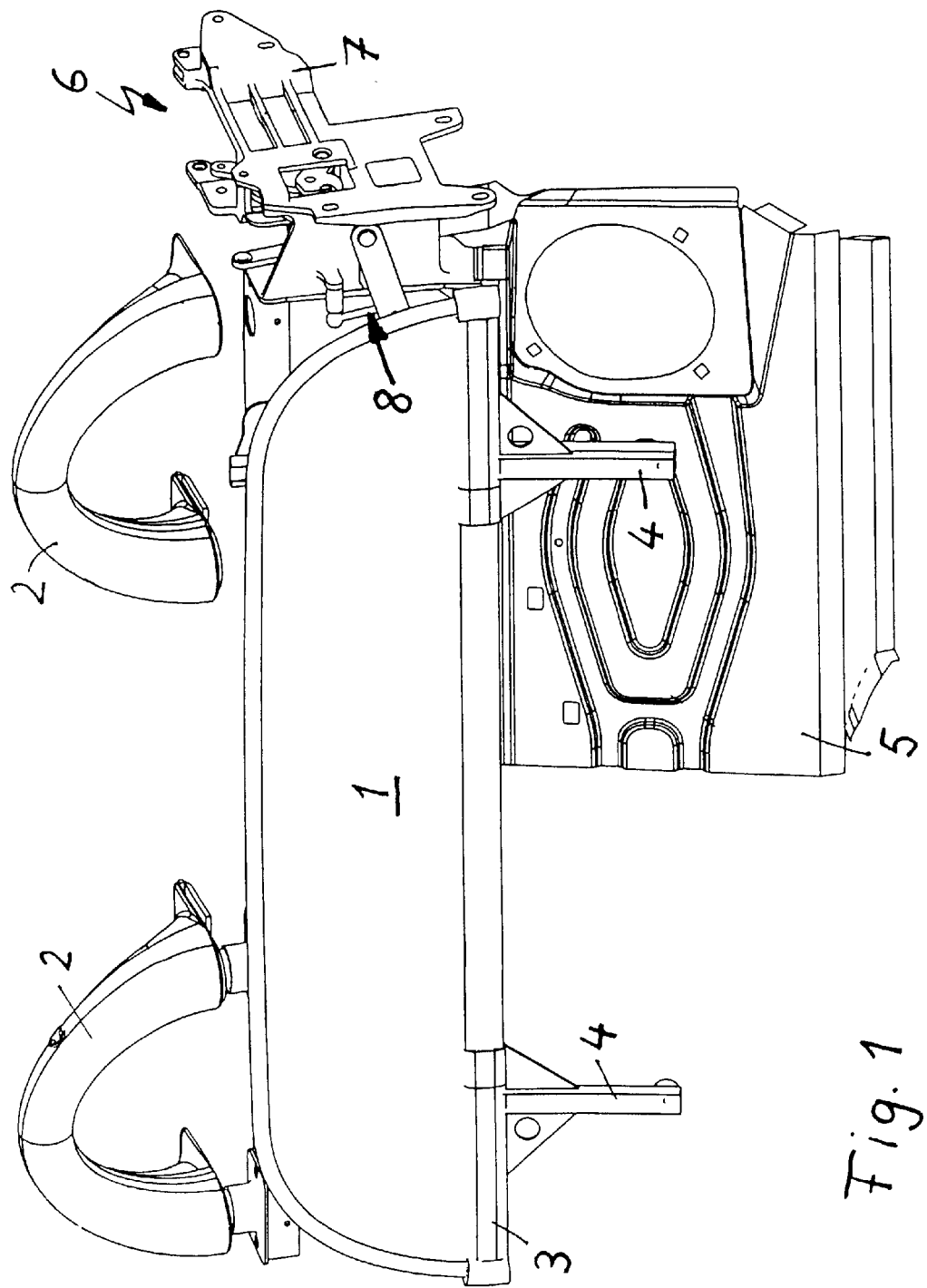
FIG. 1 is a perspective view of a wind deflector arranged in a convertible vehicle shown with the wind deflector in a lowered position.

In the following description, identical components are referred to by the same reference numerals.

Figure 2:
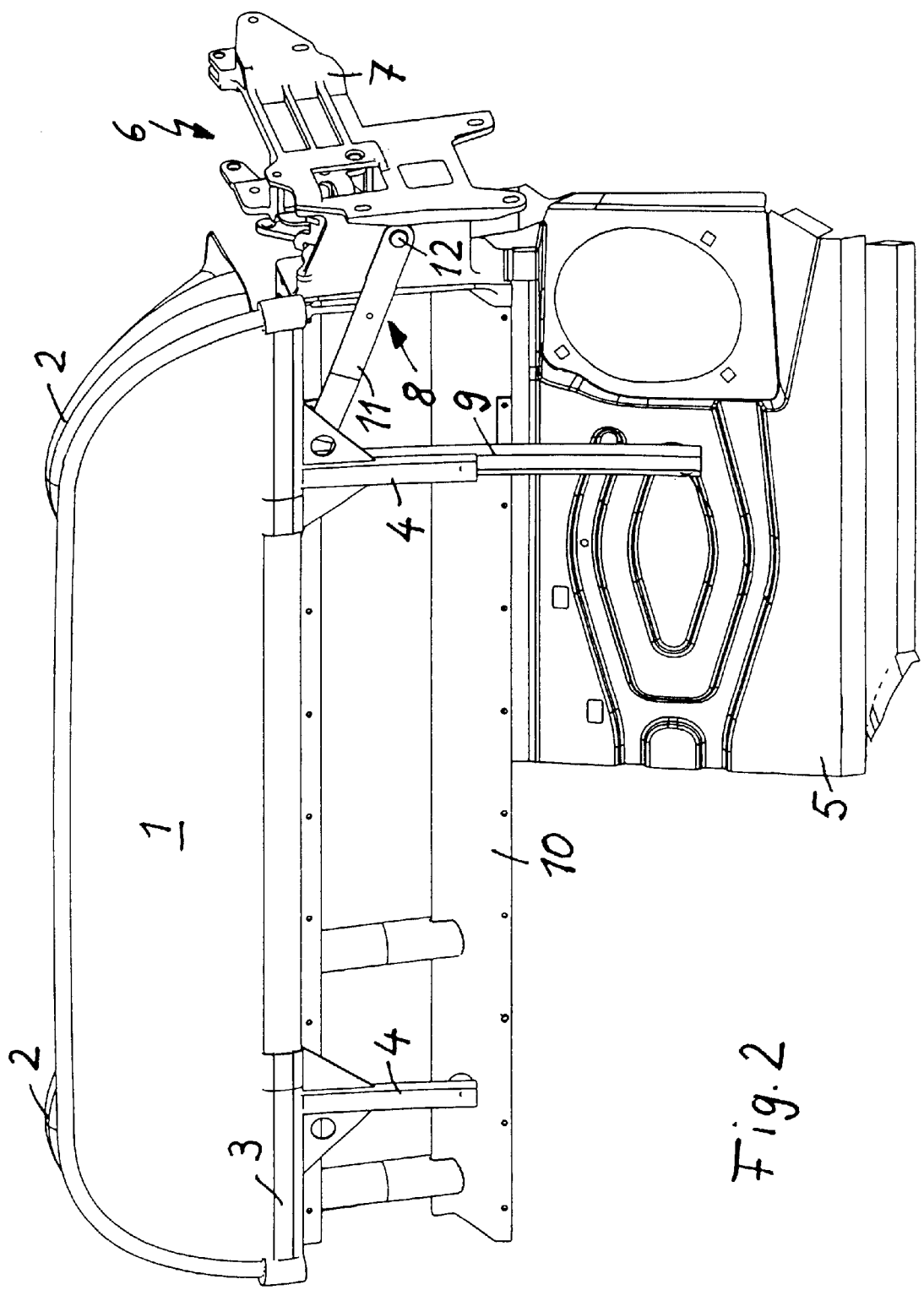
FIG. 2 is the same perspective view showing the wind deflector however in a raised position.
Figure 3:
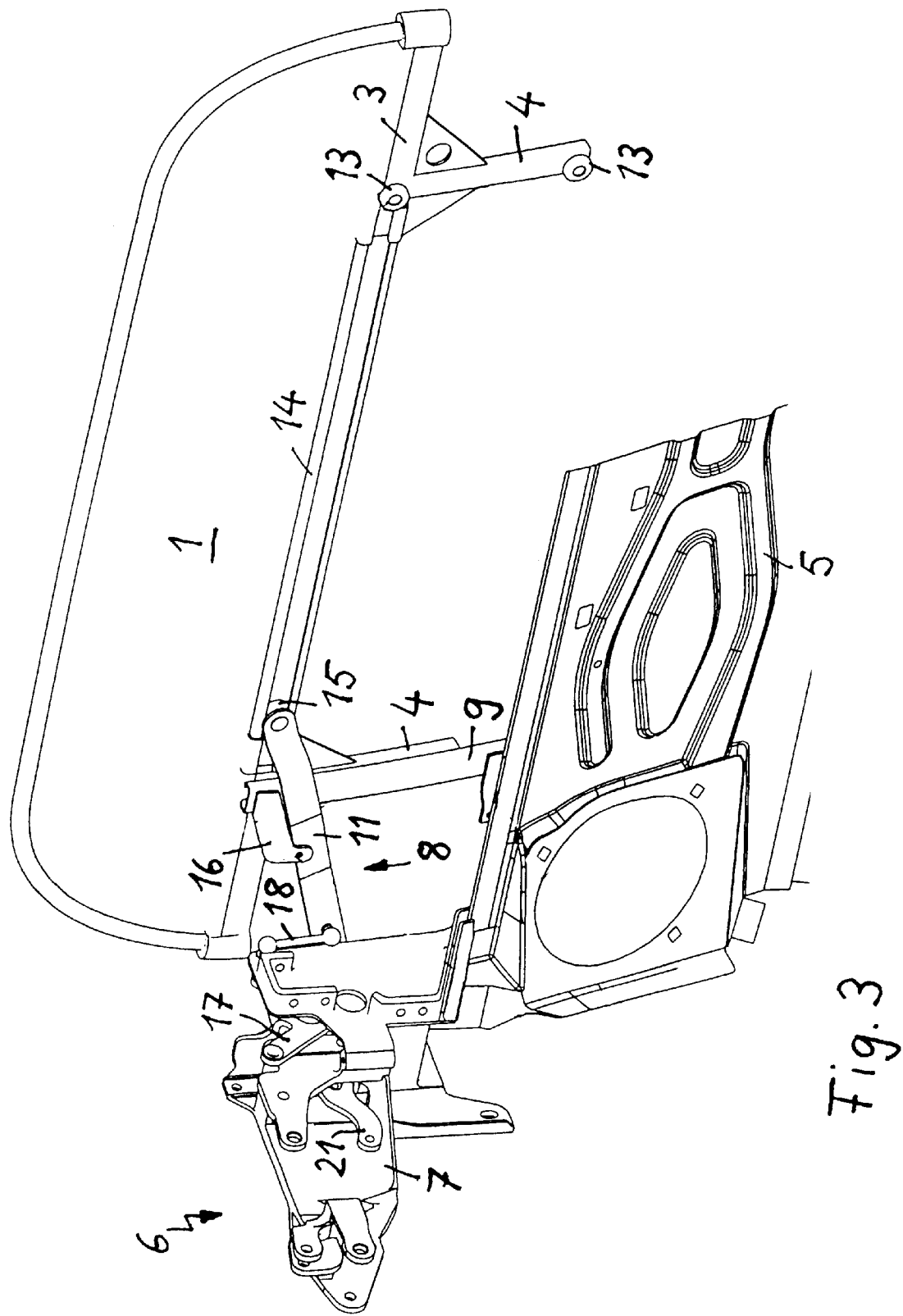
FIG. 3 is a perspective view from the back showing the wind deflector in a raised position.
Figure 4:
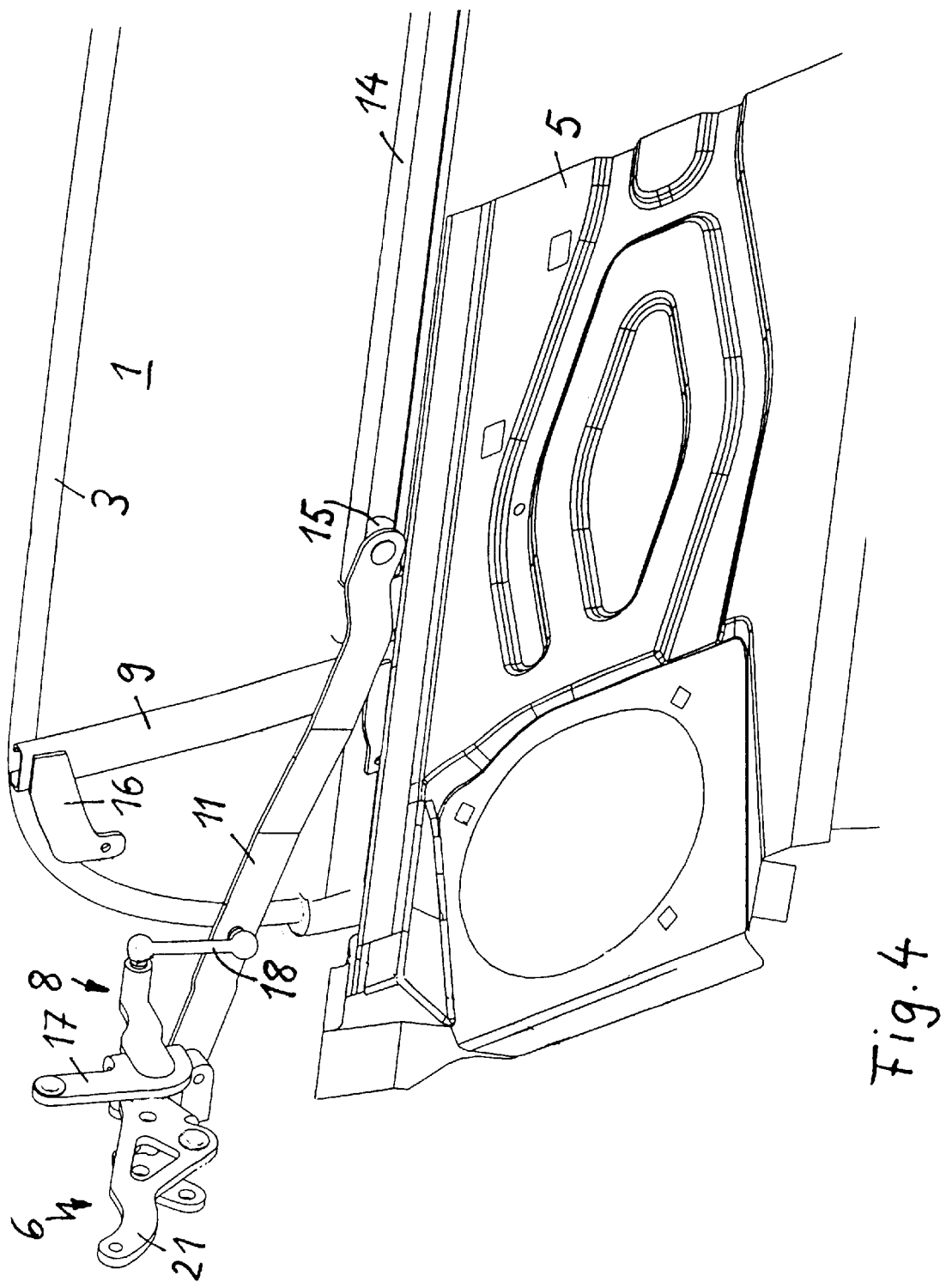
FIG. 4 is an enlarged partial view like that of FIG. 4, showing the wind deflector in a lowered position.

As shown in FIG. 1, a wind deflector 1 is arranged immediately ahead of roll bars 2. It is adjustable between a lowered position, in which it is shown in FIGS. 1 and 4 and in which the upper edge of the wind deflector preferably does not extend beyond the vehicle body contour, and the raised position as shown in FIGS. 2 and 3 in which the wind deflector is raised above the vehicle body contour about up to the level of the roll bar 2. The wind deflector 1 is disposed—in the longitudinal direction of the vehicle—between the rear side of the vehicle seats and the roll bar 2 immediately ahead of a transverse wall 5 of the vehicle body. The wind deflector 1 includes a frame 3 in which a panel of wind deflector cover material is stretched to form a wind protection panel. At its lower end, the wind deflector is provided with two frame legs 4, which extend vertically downwardly. The frame legs 4 are molded members and consist preferably of plastic material. The frame legs 4 are preferably formed integrally with the frame 3.

In the side area of the vehicle, there is a top drive arrangement for moving the vehicle top between a closed position in which it covers the vehicle interior and a storage position in which the vehicle interior is open. The top drive arrangement 6 includes a drive element, which is preferably a hydraulic cylinder 27 (see FIGS. 7 to 9), connected to a kinematical train for operating the vehicle top. The kinematical train is mounted to the vehicle body by way of a main support structure 7.

Furthermore, there is provided a wind deflector operating mechanism 8 by which the wind deflector is movable between a lowered and a raised position. The wind deflector operating mechanism 8 comprises a plurality of levers and arms which are actuated during certain phases of the opening and closing movement of the vehicle top for the raising or, respectively, the lowering of the wind deflector 1 by the vehicle top drive 6. In order to facilitate a time-coordinated movement of the vehicle top and the wind deflector, the wind deflector operating mechanism 8 may be coupled to, or uncoupled from, the vehicle top drive, particularly the hydraulic cylinder of the vehicle top drive. Preferably, the top drive train 6 and the wind deflector operating mechanism 8 are alternatively coupled to the drive element for the vehicle top, particularly the hydraulic cylinder, so that the drive element is employed selectively to operate the vehicle top or the wind deflector. In a preferred embodiment, the wind deflector operating mechanism is uncoupled from the drive element during the transfer of the vehicle top from the closed to the storage position until the top is disposed fully within the storage compartment. Subsequently, the top drive train is uncoupled from the drive element and the wind deflector operating mechanism 8 is coupled to the drive element whereby the wind deflector is then moved from its lowered position to its raised position. If the drive element is a hydraulic cylinder, preferably about 80% of the cylinder stroke is utilized as a first partial stroke for the operation of the vehicle top and the remaining 20% partial stroke are as utilized for the movement of the wind deflector 1.

During the transfer of the vehicle top from the storage position to the closed position, the procedure is reversed.

As shown in FIG. 2, in which the wind deflector 1 is in a raised position, the wind deflector is vertically linearly movably supported in guide tracks 9, which are mounted to a transverse body frame member 10. The movement of the drive mechanism is transferred by a drive arm 11, which is part of the wind deflector operating mechanism 8 and which is pivotally supported by a joint 12 on the main support structure 7 of the top operating mechanism 6. The main support structure 7 is mounted to the vehicle body. The pivot movement of the drive arm 11 about the pivot axis of the joint 12 on the main support structure 7 is converted to a vertical linear up and down movement of the wind deflector 1 by the frame legs 4 which are guided in the guide tracks 9.

As shown in FIG. 3, two vertically spaced guide rollers 13 are mounted on the frame legs 4 which provide for a guided linear movement of the wind deflector 1 along the guide track 9 mounted to the vehicle body by support brackets 16.

FIG. 3 shows furthermore that a horizontal slide track 14 is arranged on the backside of the wind deflector 1 and connected to the frame 3 in which a slide member 15 or a roller of the drive arm 11 is guided. In this way, an essentially tension-free vertical up and down movement of the wind deflector 1 in the guide tracks 9 is achieved with a pivot movement of the drive arm 11.

As is further apparent from FIG. 3, the drive arm 11 is connected to the vehicle top drive mechanism 6 by way of a ball joint link 18 and a pivot lever 17. The pivot lever 17 has a free arm, which is used for the position adjustment of a hat storage shelf 24 shown in FIGS. 6 to 9. The pivot lever 17 includes another arm 21, which is connected to the main operating lever of the vehicle top drive mechanism.

Figure 5:
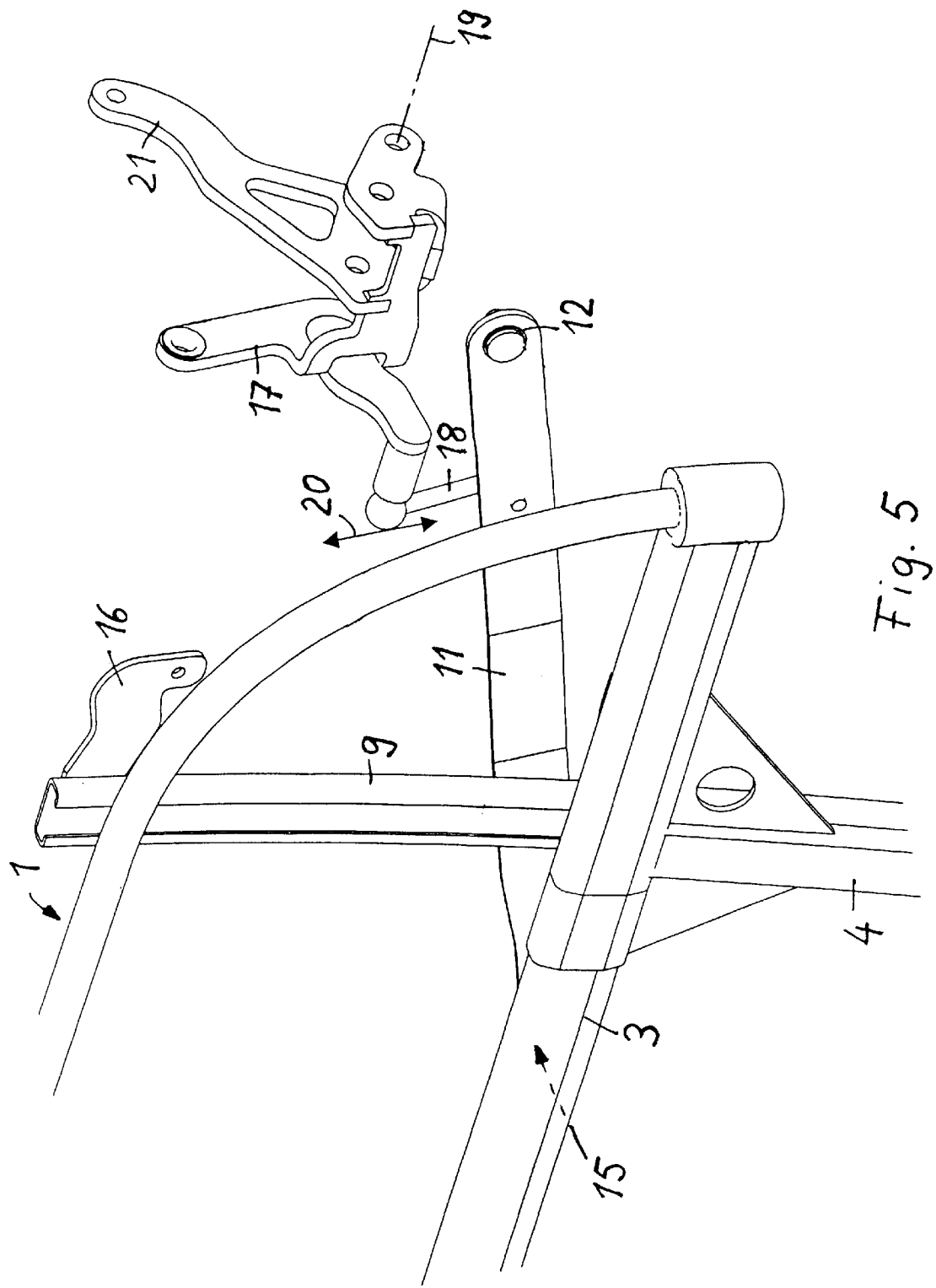
FIG. 5 is an enlarged partial perspective view showing the wind deflector operating mechanism as seen at an angle from the front.

From the enlarged representations of FIGS. 4 and 5, it is apparent that the ball joint link 18 is pivotally connected at opposite ends to the drive arm 11 and, respectively, to a sidewardly projecting arm of the pivot lever 17. The pivot lever that 17 is supported rotatably about a pivot axis 19 (FIG. 5) of the main support structure 6. The arm of the pivot lever 17, which extends radially from the pivot axis 19, is pivoted for the movement of the wind deflector 1 between its lowered and raised positions preferably by an angle of 40° to 45°. The pivot movement of the pivot lever 17 is transferred by way of the ball joint link 18 to the drive arm 11 as indicated in FIG. 5 by the arrow 20. The engagement point of the ball joint link 18 is disposed in the area between the pivot joint 12 of the drive arm 11 and the slide member 15 of the drive arm 11. The torque required for the up and down movement of the wind deflector 1 is determined by the distance between the pivot joint 12 of the drive arm 11 and the engagement point of the ball joint link 18 with the drive arm 11 as well as the force transmitted by the ball joint link 18 to the drive arm 11. The linked connection of the ball joint link 18 to the pivot lever 17 and also to the drive arm 11 facilitates a tension-free conversion of the pivot movement of the pivot lever 17 to the drive arm 11 in spite of the fact that the pivot axis of the pivot lever 17 and of the drive arm 11 cross each other.

As shown in FIG. 5, the guide tracks 9 are slightly curved in a longitudinal vehicle plane. This curvature provides for a space-saving arrangement and storage of the wind deflector directly behind the vehicle seats. Preferably, the curvature has a constant radius.

Figure 6:
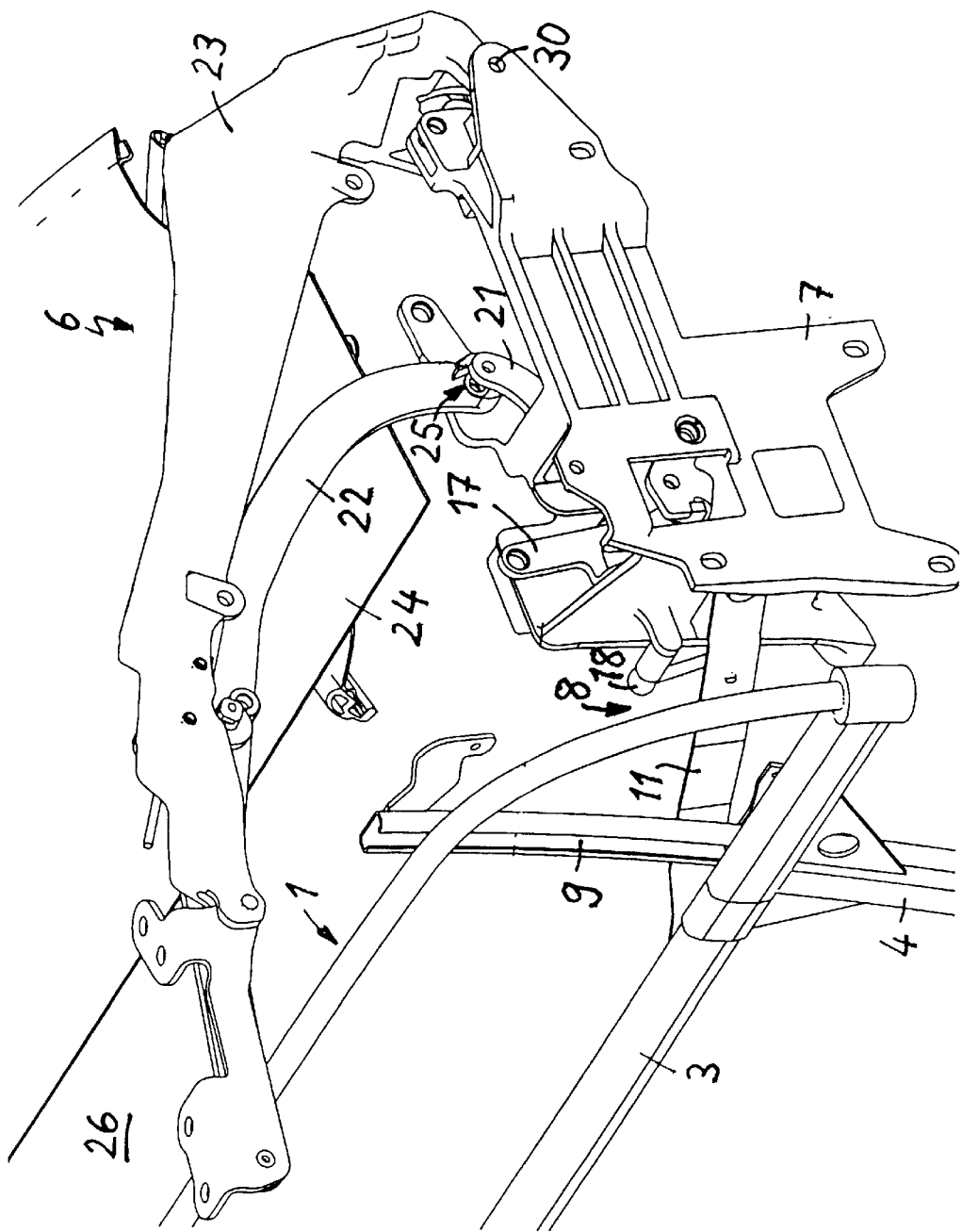
FIG. 6 shows the wind deflector in a lowered position wherein the wind deflector operating mechanism and the vehicle top kinematic elements are in a closed to position, the kinematic elements however being partially covered by a vehicle body support structure.
Figure 7:
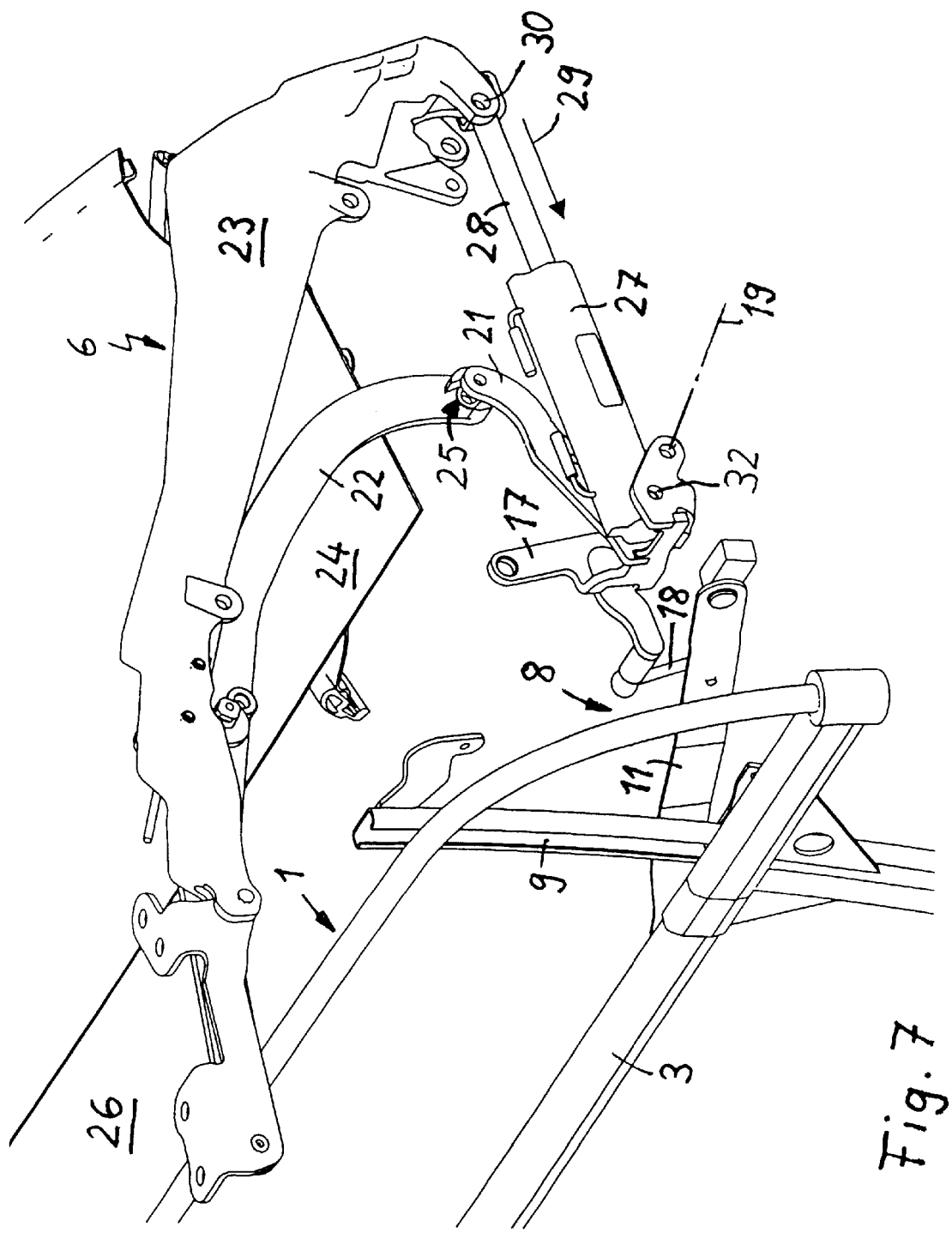
FIG. 7 is the same view as that shown in FIG. 6, however with the support structure removed so that the kinematic vehicle top operating elements are visible.
Figure 8:
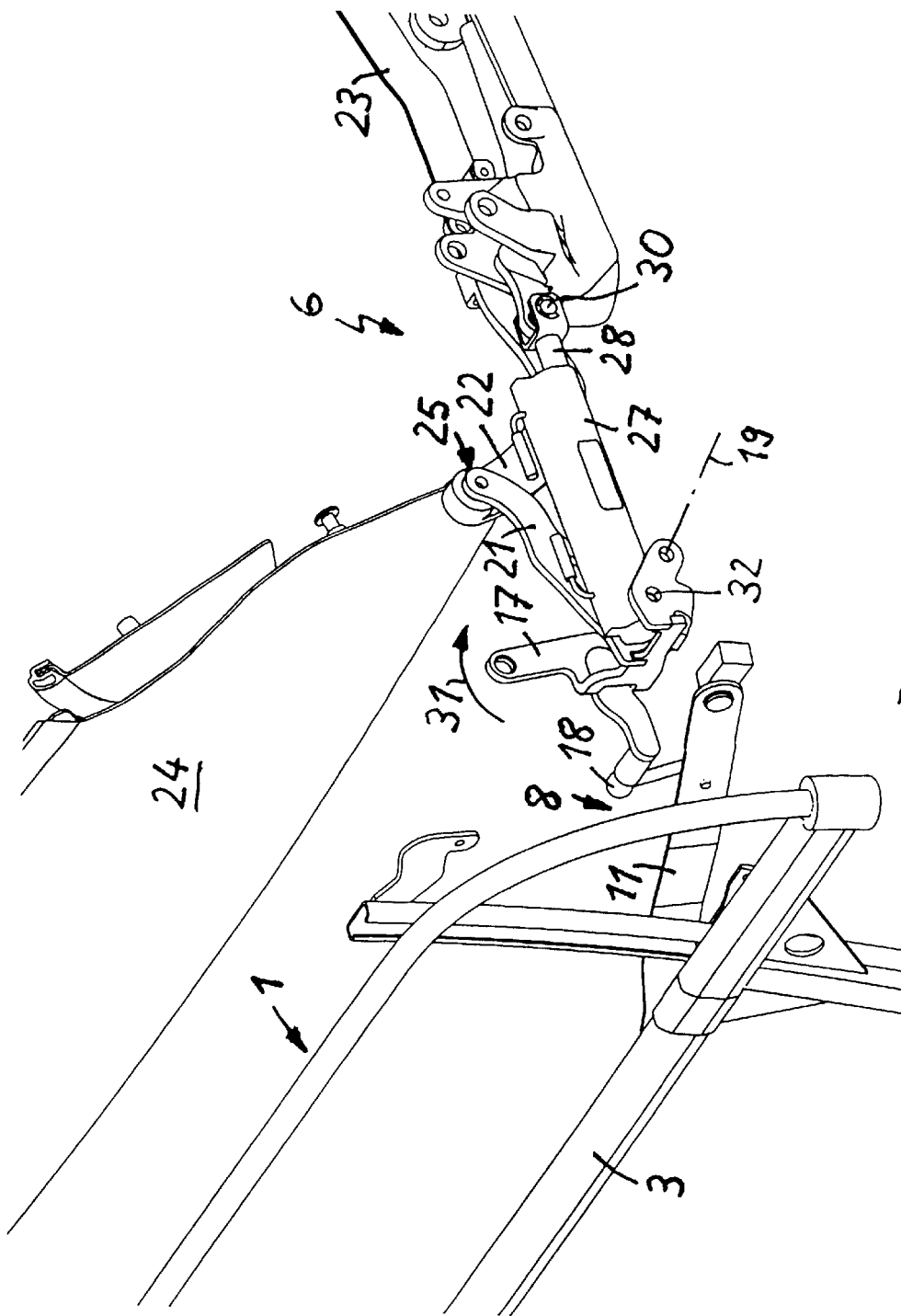
FIG. 8 shows the wind deflector in a lowered position and the top kinematic in a position in which the top is in a storage compartment.
Figure 9:
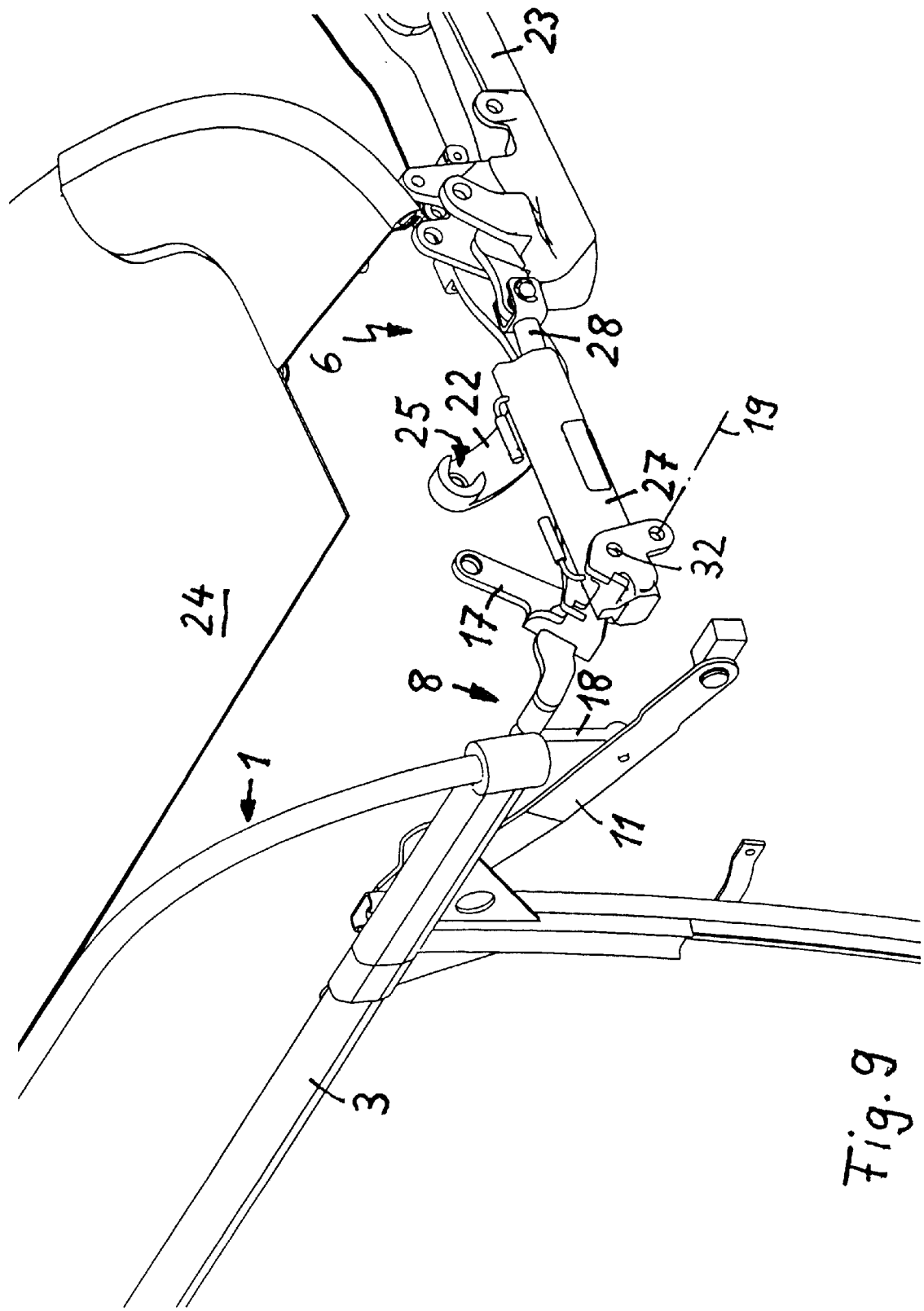
FIG. 9 shows the wind deflector in a raised position and the top kinematic elements in a position in which the top is disposed in the storage compartment.

In FIGS. 6 and 7, the vehicle top drive mechanism is shown in a position in which the vehicle top 26 is closed. In FIGS. 8 and 9, the drive mechanism is shown in a position in which the vehicle top 26 is in the storage position. In the closed position of the vehicle top 26, the operating piston 28 (FIG. 7) of the hydraulic drive cylinder 27 is completely extended.

For a transfer of the top 26 to a storage position, the operating piston 28 is retracted into the hydraulic cylinder 27 in the direction of the arrow 29 to about 80%. The hydraulic cylinder 27 is held in firm engagement with the vehicle body during the transfer of the vehicle top from the closed to the storage position. During inward movement of the piston 28 into the hydraulic cylinder 27, the pivot arm 23, which is pivotally connected to the piston 28 by the joint 30, is moved in the area of the joint 30 in the direction of the arrow 29, see FIG. 7. At the same time, the pivot arm 23 is kinematically guided by the guide link 22, which is pivotally supported by the joint 25 of the support arm 21, in order to eliminate any undefined movements of the vehicle top 26 and to provide, in general, for a pivot movement of the pivot arm 23 during opening of the vehicle top 24.

In FIG. 8, the vehicle top 26 is shown in a storage position. The operating piston 28 is retracted into the operating cylinder 27 to about 80%. Because of the pivot movement of the guide link 22 about its mouth-like receiver joint 25, the arm 21, which is firmly connected to the pivot lever 17, is released downwardly from the receiver joint 25, whereby the pivot lever 17 including its arm 21 can be pivoted independently of the guide link 22 about the pivot axis 19 in the direction of the arrow 31 into the position as shown in FIG. 9. Since the operating piston 28 can move no further in the direction of the arrow 29 as the pivot arm 23 has reached its end position in which the vehicle top is deposited in the storage compartment and since the opposite end of the hydraulic cylinder 27 is pivotally connected, by a joint 32, to the pivot lever 17, the hydraulic cylinder 27 is moved, upon further retraction of the piston 28, out of its stationary position relative to the vehicle body and will, with the remaining stroke of preferably about 20%, move in the direction toward the joint 30. During this movement during which the piston 28 is immovable with respect to the vehicle body, the hydraulic cylinder pivots the pivot lever 17 about its pivot axis 19 so that the pivot lever 17 moves in the direction of the arrow 31 as indicated in FIG. 8. The pivot lever, as a result, assumes the position as shown in FIG. 9 in which the wind deflector 1 is moved to its raised position by the transmissions of the pivot motion of the pivot lever 17, by way of the ball joint link 18 and the drive arm 11, to the wind deflector 1.

The transition from the movement of the vehicle top, which is provided for by the first partial stroke of the operating piston 28 into the hydraulic cylinder 27, to the movement of the wind deflector 1 provided for by the remaining partial stroke of the operating piston 28, is made possible by the release of the support arm 21 of the pivot lever 17 from the joint 25 of the guide link 22 in connection with the stationary position of the joint 30 of the pivot arm 23 in the end position thereof, in which the top is disposed in the storage compartment. During the first partial stroke, the operating piston 28 is moved relative to the cylinder 27 while the cylinder 27 is held stationary. During the remaining stroke, the operating piston 28 is held stationary while the hydraulic cylinder 27 is released and is then moved relative to the operating piston. In this way, it is possible to provide, with a single hydraulic operating element, in a coordinated movement, first for the opening of the vehicle top and then for the raising of the wind deflector or, respectively, vice versa for closing of the vehicle top, first for a lowering of the wind deflector and subsequently for the movement of the vehicle top out of the storage compartment into the closed position.

Preferably, the movement of the wind deflector is kinematically coupled with the movement of the shelf 24. The shelf 24 may be connected to the pivot lever 17 by a linkage, which is not shown in the figures.

What is claimed is:

1. A wind deflector for a convertible vehicle with an adjustable top, said wind deflector being supported by essentially vertically extending guide tracks so as to be movable between a lowered position and a raised position and said vehicle top being movable between a closed position, in which it covers the vehicle interior, and a storage position, in which the vehicle top is disposed in a rear storage compartment, a drive mechanism for moving said vehicle top between said closed and storage positions and an operating linkage for moving said wind deflector between said lowered and said raised positions, said wind deflector operating linkage being coupled to said vehicle top drive mechanism in such a way that said wind deflector can be raised and lowered only during certain movement phases of said drive mechanism.

2. A wind deflector according to claim 1, wherein, during said certain movement phases of said drive mechanisms, the movement of said wind deflector is accelerated or respectively, delayed with respect to the movement of said vehicle top.

3. A wind deflector according to claim 1, wherein, during movement of said vehicle top from the closed to the storage position, the wind deflector operating linkage is kept inoperative and wherein, when the vehicle top is deposited in its storage position, the wind deflector operating mechanism is activated by said drive mechanism for raising said wind deflector.

4. A wind deflector according to claim 1, wherein said drive mechanism includes a hydraulic cylinder with an operating piston having a first partial stroke length, in which said vehicle top operating mechanism is operated by said operating piston and a second partial stroke length during which said piston remains stationary and said wind deflector is operated by movement of said hydraulic cylinder.

5. A wind deflector according to claim 1, wherein said wind deflector operating linkage includes a drive arm which is operatively connected to said drive mechanisms and which engages said wind deflector for movement thereof along said guide tracks to the raised and lowered positions.

6. A wind deflector according to claim 5, wherein said drive arm is, at one end, pivotally supported on said vehicle body and, at the opposite end, engages a slide track mounted to said wind deflector.

7. A wind deflector according to claim 6, wherein said slide track is mounted to the horizontal lower end of said wind deflector.

8. A wind deflector according to claim 1, wherein said wind deflector is connected to said top drive mechanisms by way of a pivot lever, which is connected to the wind deflector by a ball joint link.

9. A wind deflector according to claim 7, wherein said pivot lever is adapted to pivot not more than 45° for moving the wind deflector between the lowered and the raised positions.

10. A wind deflector according to claim 1, wherein said wind deflector is arranged between the vehicle seats and a roll bar disposed behind the vehicle seats.

11. A wind deflector according to claim 1, wherein said essentially vertically extending wind deflector support tracks are curved with a constant curvature.

* * * * *